United States Patent
Aganagic et al.

(10) Patent No.: US 10,268,973 B2
(45) Date of Patent: Apr. 23, 2019

(54) SYSTEMS, METHODS AND APPARATUS FOR A STAKEHOLDER MARKET SIMULATOR FOR ENERGY DELIVERY SYSTEMS

(71) Applicant: Siemens Industry, Inc., Alpharetta, GA (US)

(72) Inventors: Muhamed Aganagic, Minneapolis, MN (US); Sankaran Rajagopal, Plymouth, MN (US); Walter Wuest, Morgan Hill, CA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 280 days.

(21) Appl. No.: 14/631,060

(22) Filed: Feb. 25, 2015

(65) Prior Publication Data

US 2015/0242785 A1 Aug. 27, 2015

Related U.S. Application Data (60) Provisional application No. 61/944,085, filed on Feb. 25, 2014.

(51) Int. Cl.
*G06Q 10/06* (2012.01)
(52) U.S. Cl.
CPC ..... *G06Q 10/06315* (2013.01); *G06Q 10/067* (2013.01); *G06Q 10/06314* (2013.01)
(58) Field of Classification Search
None
See application file for complete search history.

(56) References Cited

U.S. PATENT DOCUMENTS 5,650,936 A * 7/1997 Loucks ............... G01R 19/2513
324/118
6,021,402 A * 2/2000 Takriti ................... G06Q 50/06
705/412
(Continued)

FOREIGN PATENT DOCUMENTS

EP 1418477 A1 * 5/2004 ........... G05B 13/042
EP 1478075 A2 * 11/2004 ................ H02J 3/00
(Continued)

OTHER PUBLICATIONS

Hogan, William W. "Multiple market-clearing prices, electricity market design and price manipulation." The Electricity Journal25.4 (2012): 18-32. (Year: 2012).*

(Continued)

*Primary Examiner* — Thomas L Mansfield
*Assistant Examiner* — Derick J Holzmacher (57) ABSTRACT

Embodiments provide stakeholder market simulator systems and methods for verifying optimal utilization of stakeholder resources in an energy delivery system. Embodiments include obtaining initial resource schedules and prices for a stakeholder's resources using a set of input data regarding the stakeholder's resources; creating a model incorporating constraints describing the stakeholder's resources based on the input data; executing an optimization of an objective function for the stakeholder's resources subject to the determined constraints to determine optimal prices and schedules for the stakeholder's resources; and verifying the optimization by comparing the determined optimal prices and schedules for the stakeholder's resources against published prices and schedules from an independent system operator. Numerous other aspects are provided.

15 Claims, 3 Drawing Sheets

(56) References Cited

U.S. PATENT DOCUMENTS

| | | | | | |
|---|---|---|---|---|---|
| 6,047,274 | A * | 4/2000 | Johnson | | G06Q 10/04 705/412 |
| 6,529,839 | B1 * | 3/2003 | Uggerud | | H02J 3/008 702/106 |
| 7,058,522 | B2 * | 6/2006 | Chen | | H02J 3/00 702/60 |
| 7,062,361 | B1 * | 6/2006 | Lane | | F25D 29/00 700/291 |
| 7,085,660 | B2 * | 8/2006 | Mansingh | | G06Q 50/06 700/291 |
| 7,321,810 | B2 * | 1/2008 | Mansingh | | H02J 3/00 324/76.11 |
| 7,343,360 | B1 * | 3/2008 | Ristanovic | | G06Q 30/08 705/412 |
| 7,349,882 | B2 * | 3/2008 | Bjelogrlic | | G06Q 30/08 705/37 |
| 7,606,684 | B1 * | 10/2009 | Pierce | | G06Q 10/04 702/189 |
| 8,359,124 | B2 * | 1/2013 | Zhou | | G05B 13/024 700/276 |
| 8,812,165 | B1 * | 8/2014 | Smith | | G01R 19/2513 700/28 |
| 2002/0019758 | A1 * | 2/2002 | Scarpelli | | G06Q 10/06 705/26.2 |
| 2002/0062231 | A1 * | 5/2002 | Zaccaria | | G06Q 40/08 705/4 |
| 2003/0041002 | A1 * | 2/2003 | Hao | | G06Q 30/06 705/37 |
| 2003/0182250 | A1 * | 9/2003 | Shihidehpour | | G06N 3/02 706/21 |
| 2003/0220864 | A1 * | 11/2003 | Peljto | | G06Q 10/06 705/37 |
| 2004/0102873 | A1 * | 5/2004 | Stark | | G05B 23/0267 700/286 |
| 2004/0215348 | A1 * | 10/2004 | Ilic | | G06Q 20/102 700/1 |
| 2004/0246643 | A1 * | 12/2004 | Chen | | H02J 3/00 361/115 |
| 2004/0257059 | A1 * | 12/2004 | Mansingh | | H02J 3/00 324/76.11 |
| 2004/0257858 | A1 * | 12/2004 | Mansingh | | G06Q 50/06 365/154 |
| 2004/0260430 | A1 * | 12/2004 | Mansingh | | G06Q 50/06 700/286 |
| 2004/0260489 | A1 * | 12/2004 | Mansingh | | G06Q 50/06 702/60 |
| 2005/0004858 | A1 * | 1/2005 | Foster | | G06Q 10/06 705/36 R |
| 2005/0015283 | A1 * | 1/2005 | Iino | | G06Q 10/06315 705/4 |
| 2005/0137959 | A1 * | 6/2005 | Yan | | G06Q 20/102 705/37 |
| 2005/0197742 | A1 * | 9/2005 | Scott | | G06Q 40/04 700/286 |
| 2007/0293156 | A1 * | 12/2007 | Yuen | | H02J 3/008 455/63.3 |
| 2008/0262820 | A1 * | 10/2008 | Nasle | | G06Q 10/04 703/18 |
| 2009/0281677 | A1 * | 11/2009 | Botich | | G06Q 10/00 700/295 |
| 2010/0114387 | A1 * | 5/2010 | Chassin | | G06Q 20/102 700/286 |
| 2010/0161472 | A1 * | 6/2010 | Zheng | | G06Q 30/08 705/37 |
| 2011/0106328 | A1 * | 5/2011 | Zhou | | G05B 13/024 700/291 |
| 2012/0010758 | A1 * | 1/2012 | Francino | | G05B 17/02 700/291 |
| 2012/0179301 | A1 * | 7/2012 | Aivaliotis | | H02J 3/00 700/286 |
| 2012/0296482 | A1 * | 11/2012 | Steven | | G06Q 50/06 700/291 |
| 2013/0245847 | A1 * | 9/2013 | Steven | | G06Q 50/06 700/291 |
| 2013/0346139 | A1 * | 12/2013 | Steven | | G06Q 10/00 705/7.24 |
| 2014/0039965 | A1 * | 2/2014 | Steven | | G06Q 10/06315 705/7.25 |
| 2014/0304025 | A1 * | 10/2014 | Steven | | G06Q 10/06314 705/7.24 |
| 2014/0330611 | A1 * | 11/2014 | Steven | | G06Q 10/06314 705/7.24 |
| 2014/0330695 | A1 * | 11/2014 | Steven | | G06Q 30/0283 705/37 |
| 2014/0365022 | A1 * | 12/2014 | Ghosh | | G06Q 50/06 700/291 |
| 2015/0088576 | A1 * | 3/2015 | Steven | | G06Q 50/06 705/7.22 |
| 2015/0234410 | A1 * | 8/2015 | Aganagic | | G05F 1/66 700/291 |

FOREIGN PATENT DOCUMENTS

| | | | | |
|---|---|---|---|---|
| EP | 1478074 B1 * | 10/2010 | | H03J 3/00 |
| EP | 1478073 B1 * | 4/2012 | | H02J 3/00 |
| WO | WO-9838844 A2 * | 9/1998 | | G06Q 10/04 |
| WO | WO-0077702 A1 * | 12/2000 | | G06Q 30/0601 |
| WO | WO-2004079549 A2 * | 9/2004 | | G06Q 10/00 |
| WO | WO-2006092067 A1 * | 9/2006 | | H02J 3/008 |
| WO | WO-2013067213 A1 * | 5/2013 | | G06Q 50/06 |
| WO | WO-2015023568 A2 * | 2/2015 | | G06Q 10/06314 |

OTHER PUBLICATIONS

Takriti, Samer, John R. Birge, and Erik Long. "A stochastic model for the unit commitment problem." IEEE Transactions on Power Systems 11.3 (1996): 1497-1508. (Year: 1996).*

Post, D. L., S. S. Coppinger, and G. B. Sheble. "Application of auctions as a pricing mechanism for the interchange of electric power." IEEE Transactions on Power Systems 10.3 (1995): 1580-1584. (Year: 1995).*

Cheung, Kwok W., et al. "Functional requirements of energy and ancillary service dispatch for the interim ISO New England electricity market." Power Engineering Society 1999 Winter Meeting, IEEE. vol. 1. IEEE, 1999. (Year: 1999).*

* cited by examiner

SYSTEMS, METHODS AND APPARATUS FOR A STAKEHOLDER MARKET SIMULATOR FOR ENERGY DELIVERY SYSTEMS

RELATED APPLICATIONS

The present application claims priority to U.S. Provisional Application No. 61/944,085 titled "Stakeholder Market Simulator" filed Feb. 25, 2014, which is incorporated herein by reference for all purposes.

FIELD

The present invention relates to operating energy delivery systems, and more specifically to a stakeholder market simulator for energy delivery systems.

BACKGROUND

Electricity is by its nature difficult to store and has to be available on demand. Consequently, unlike other products, it is not possible, under normal operating conditions, to keep it in stock, ration it or have customers queue for it. Furthermore, demand and supply vary continuously. There is therefore a physical requirement for a controlling agency, the independent system operator (ISO), to coordinate the dispatch of generating units to meet the expected demand of the system across the transmission grid. If there is a mismatch between supply and demand, the generators speed up or slow down causing the system frequency (either 50 or 60 hertz) to increase or decrease. If the frequency falls outside a predetermined range the system operator will act to add or remove either generation or load. In addition, the laws of physics determine how electricity flows through an electricity network. Hence the extent of energy lost in transmission and the level of congestion on any particular branch of the network will influence the economic dispatch of the generation units (e.g., electric generators).

Thus, in economic terms, electricity (both power and energy) is a commodity capable of being bought, sold and traded. An electricity market is a system for effecting purchases, through bids to buy; sales, through offers to sell; and short-term trades, generally in the form of financial or obligation swaps. Bids and offers use supply and demand principles to set the price. Long-term trades are contracts similar to power purchase agreements and are generally considered private bi-lateral transactions between counter-parties. Most electricity markets, and many other markets, function in accordance with a bid-based, security constrained, economic dispatch model.

Wholesale transactions (e.g., bids and offers) in electricity are typically cleared and settled by the market operator or a special-purpose independent entity charged exclusively with that function (e.g., ISOs). Market operators do not clear trades but often require knowledge of the trade in order to maintain generation and load balance. The commodities within an electric market generally include two types: power and energy. Power is the metered net electrical transfer rate at any given moment and is measured in megawatts (MW). Energy is electricity that flows through a metered point for a given period and is measured in megawatt hours (MWh).

Markets for energy-related commodities trade net generation output for a number of intervals usually in increments of 5, 15 and 60 minutes. Markets for power-related commodities required and managed by (and paid for by) market operators to ensure reliability, are considered ancillary services and include such names as spinning reserve, non-spinning reserve, operating reserves, responsive reserve, regulation up, regulation down, and installed capacity.

In addition, for most major operators, there are markets for transmission congestion and electricity derivatives such as electricity futures and options, which are actively traded. These markets developed as a result of the restructuring of electric power systems around the world.

The scope of each electricity market includes the transmission grid or network that is available to the wholesalers, retailers and the ultimate consumers in any given geographic area. Markets may extend beyond national boundaries.

In order to insure consistent and reliable delivery of electricity to businesses, hospitals, homes, etc., electricity markets are structured to efficiently and timely effect transactions. For an economically efficient electricity market to be successful it is helpful that a number of criteria are met, namely the existence of a coordinated spot market that has bid-based, security-constrained, economic dispatch. The system price in the day-ahead market is, in principle, determined by matching offers from generators (e.g., market stakeholders) to bids from consumers at each node to develop a classic supply and demand equilibrium price, usually on an hourly interval, and is calculated separately for sub-regions in which the system operator's load flow model indicates that constraints will bind transmission imports.

Market participants or stakeholders in the market typically rely upon publically available published historical information from the ISOs and the stakeholder's own private information to determine costs and appropriate unit commitments and pricing in the form of offers. However, the information from the ISO is limited to past market data and schedules optimized for the overall market welfare and not for the specific stakeholder. Therefore, what is needed are systems, methods and apparatus for a stakeholder market simulator for energy delivery systems.

SUMMARY

In some embodiments, a method of verifying optimal utilization of stakeholder resources in an energy delivery system is provided. The method includes obtaining initial resource schedules and prices for a stakeholder's resources using a set of input data regarding the stakeholder's resources; creating a model incorporating constraints describing the stakeholder's resources based on the input data; executing an optimization of an objective function for the stakeholder's resources subject to the incorporated constraints to determine optimal prices and schedules for the stakeholder's resources; and verifying the optimization by comparing the determined optimal prices and schedules for the stakeholder's resources against published prices and schedules from an independent system operator.

In other embodiments, a stakeholder market simulator (SMS) system for verifying optimal utilization of stakeholder resources in an energy delivery system is provided. The system includes a processor; a memory coupled to the processor and storing instructions executable on the processor, the instructions operable to: obtain initial resource schedules and prices for a stakeholder's resources using a set of input data regarding the stakeholder's resources; create a model incorporating constraints describing the stakeholder's resources based on the input data; execute an optimization of an objective function for the stakeholder's resources subject to the incorporated constraints to determine optimal prices and schedules for the stakeholder's resources; and verify the optimization by comparing the determined optimal prices and schedules for the stakeholder's resources against published prices and schedules from an independent system operator.

In still other embodiments, a stakeholder market simulator (SMS) system for verifying optimal utilization of stakeholder resources in an energy delivery system is provided. The SMS system includes a SMS application executing on a processor within a computer; a SMS database accessible by the SMS application; a user interface operable to invoke collection of data from external interfaces and to access the SMS database; a model creation function executable by the SMS application and operable to return constraints describing SMS entities to the SMS application; and a solver executable by the SMS application and operable to return optimal prices and schedules to the SMS application.

Numerous other aspects are provided in accordance with these and other aspects of the invention. Other features and aspects of the present invention will become more fully apparent from the following detailed description, the appended claims and the accompanying drawings.

DESCRIPTION

Embodiments of the present invention provide systems, apparatus and methods for a stakeholder market simulator (SMS) for electricity delivery, or more generally, energy delivery systems. Embodiments of the present invention include software applications and systems adapted to help market participants, also referred to herein as stakeholders, to address challenges related to understanding the market; decision making regarding their own unit commitments, scheduling, and offers; and verification of ISO published information regarding market data including bids, schedules and other information. In general, embodiments implement a stakeholder-centric optimized model of the energy market in order to support stakeholders in determining if the decisions made by the ISO for the general welfare is good for the stakeholder's welfare and if not, what alternatives the stakeholder can pursue.

ISOs use many tools to model and optimize operation of the market, usually based on a security constrained, unit commitment (SCUC) market model. For example, a commercially available SCUC market model includes the Spectrum Power™ Security-Constrained Unit Commitment software system manufactured by Siemens Industry, Inc. Details of another example SCUC model can be found in U.S. Pat. No. 7,349,882 issued Mar. 25, 2008 to Bjelogrlic et al. which is hereby incorporated herein for all purposes. In such SCUC model, an objective function is optimized subject to a number of constraints that define the market and electricity deliver system. An example of an objective function for a SCUC model is given as:

$$\min \sum_{h=1}^{T} \sum_{i=1}^{N} \left[ SUC_i(1 - U_{i,h-1})U_{i,h} + MLC_{i,h}U_{i,h} + \int_{P_{mini}}^{P_{i,h}} C_{i,h}(P_{i,h})dP + \right.$$

$$\left. C_{i,h}^{RU} \cdot RU_{i,h} + C_{i,h}^{RD} \cdot RD_{i,h} + C_{i,h}^{SP} \cdot SP_{i,h} + C_{i,h}^{NS} \cdot NS_{i,h} \right]$$

Where
h represents an Hour index
T represents the Total number of hours in the time horizon
i represents a Resource index
N represents the total Number of resources
$P_{i,h}$ represents the Power output of resource i in hour h
$RU_{i,h}$ represents the Regulation Up provided by resource i in hour h
$RD_{i,h}$ represents the Regulation Down provided by resource i in hour h
$SP_{i,h}$ represents the SPinning reserve provided by resource i in hour h
$NS_{i,h}$ represents the Non-Spinning reserve provided by resource i in hour h
$C_{i,h}(P_{i,h})$ represents the Cost ($/hour) as a piece-wise constant function of output (MW) for resource i in hour h
$C_{i,h}^{RU}$ represents the bid Cost ($/MW) of regulation up (MW) for resource i in hour h
$C_{i,h}^{RD}$ represents the bid Cost ($/MW) of regulation down (MW) for resource i in hour h
$C_{i,h}^{SP}$ represents the bid Cost ($/MW)of spinning reserve (MW) for resource i in hour h
$C_{i,h}^{NS}$ represents the bid Cost ($/MW) of non-spinning reserve (MW) for resource i in hour h
$SUC_i$ represents the Start-Up Cost ($/start) for resource i
$MLC_{i,h}$ represents the Minimum Load Cost ($/hr) for resource i in hour h
$U_{i,h}$ represents commitment status; =0 if resource i is off-line, and =1 if resource i is online, in hour h Further details of this example SCUC model can be found in the California ISO Technical Bulletin 2009 Jun. 5 entitled "Market Optimization Details", revised Nov. 19, 2009 and which is hereby incorporated herein for all purposes. Copies of this article may be obtained from the California ISO website.

In contrast to the above-described market model, the model used in the stakeholder market simulator of embodiments of the present invention is adapted to optimize outcomes for the stakeholder using the stakeholder market simulator (SMS) system. In the same manner as the ISO market, the SMS system of embodiments of the present invention follows a scheduling and pricing execution paradigm. Namely, an integrated forward market (IFM) scheduling execution performs a global non-convex, mixed-integer programming (MIP) type optimization determining, inter alia, unit commitment decisions. The IFM scheduling execution is then followed by a pricing execution, a local, LP-based optimization resulting in final schedules and market clearing prices. The objectives of the SMS system optimizations is the same as in the ISO's modeling of the actual market including unit/bid startup (and shutdown), no load cost and generation/load schedules, a self-schedule for violations, cost as well as various penalties for system constraint violations, etc. The difference though is that the SMS system only optimizes the resources of the stakeholder using the SMS system and not those of other stakeholders.

The SMS system of embodiments of the present invention can use information from the stakeholder's own static data (e.g., generation, intertie and load resource parameters) and dynamic data (e.g., bids, self-schedules, derates and outages) as well as public data as it is made available by the ISO. In some embodiments, the SMS system operates on historical data, attempting to replicate the market operations as observed and published. However, in some embodiments, the SMS system can also operate on forecasted and/or hypothetical data.

The SMS system of embodiments of the present invention models the stakeholder's resources and their respective bids in the same way the resources and bids are modeled in the ISO's model of the actual market. In other words, if the stakeholder's resources were the only resources in the market and the SMS system had access to the market published network information, the SMS system would exactly and completely replicate the market results of the ISO's optimization. This of course is not the case. In addition, the fact that the market includes other competing stakeholders with their own resources that can cause the ISO to optimize the overall market in a manner that is suboptimal for an individual stakeholder is one of the reasons the SMS system can help the individual stakeholder. By realizing that the ISO's market optimization is inconsistent with the individual stakeholder's optimization, the stakeholder can begin to identify how his operations can be altered for a better outcome.

As used herein, the term "SMS-entities" shall refer to the resources and bids for which, in the SMS system user's estimation, there is complete, credible information. The remaining market entities shall be referred to herein as "non-SMS entities". The SMS entities are represented in an SMS database (DB) in the same detail and with the same attributes as these entities are represented in the ISO's model of the actual market. Note that the SMS entities include all of the entities of the stakeholder using the SMS system. In some embodiments, the SMS entities can include other entities that are not those of the stakeholder. It is expected that this set of entities will expand in time as more information is collected and analyzed using SMS system facilities and as more information becomes publically available.

Figure 1:
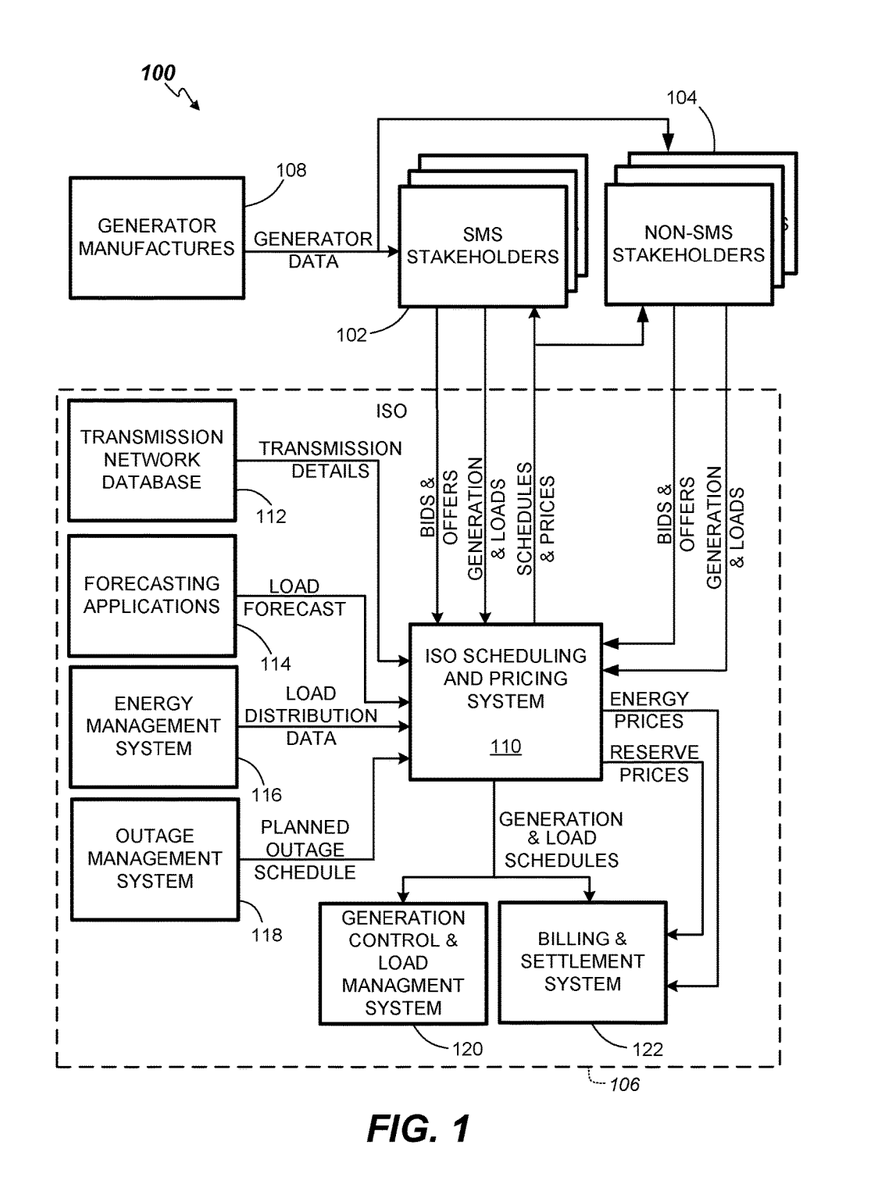
FIG. 1 is a schematic depiction of a portion of an example energy delivery system including a stakeholder market simulator according to embodiments of the present invention.

Turning now to FIG. 1, a portion of an example energy delivery system 100 including an example of SMS stakeholders 102 (e.g., stakeholders equipped with a stakeholder market simulator system according to embodiments of the present invention) is depicted in a schematic block diagram. The energy delivery system 100 also includes non-SMS stakeholders 104 (e.g., stakeholders not equipped with an SMS system). Both SMS stakeholders 102 and non-SMS stakeholders 104 are configured to communicate with an ISO 106. In addition, both SMS stakeholders 102 and non-SMS stakeholders 104 are configured to communicate with other entities and information sources such as, for example, generator manufacturers 108 that provide data regarding generator resources to the stakeholders 102, 104.

The stakeholders 102, 104 exchange data with the ISO 106. The data includes bids and offers as well as generation capacity and required loads that are transmitted to the ISO scheduling and pricing system 110 of the ISO 106. The ISO scheduling and pricing system 110 returns schedules and pricing data to the stakeholders 102, 104. Note that the data is exchanged via computer communications networks. The ISO scheduling and pricing system 110 also receives data from a plurality of other data sources including a transmission network database 112 that provides transmission details, forecasting applications 114 that provide load forecasts, an energy management system 116 that provides load distribution data, and an outage management system 118 that provides a planned outage schedule.

Based on these inputs, the scheduling and pricing system 110 determines the generation and load schedules as well as energy and reserve prices. The generation and load schedules are distributed to a generation control and load management system 120 as well as a billing and settlement system 122. The energy and reserve prices are also distributed to the billing and settlement system 122 and the stakeholder 102, 104.

The scheduling and pricing system 110 determines the generation and load schedules and energy and reserve prices based upon a market clearing or dispatch model that incorporates the inputs from the various data sources as a large number of interrelated constraints. As discussed above, the market clearing model is optimized to find the best solution for the overall welfare of all participants subject to the constraints. Conventional market clearing systems define pricing executions using a linear programming model.

In some embodiments, the stakeholders 102, 104 are embodied as applications and databases controlled by market participants (e.g., owners of generation and transmission equipment, load consumers, energy traders, etc.) for entering, accessing, storing, and maintaining historical records regarding supply and demand bids and offers (e.g., price and quantity) from the market participants as well as current information of such bids and offers along with information regarding the generation and transmission equipment used.

An outage management system 118 provides the ISO 106 with both outage requests for generation equipment and for transmission equipment. In return, the ISO 106 provides optimized outage schedules for both generation equipment and transmission equipment to the outage management system 118. To determine the optimized outage schedules, the ISO 106 receives load distribution data from the energy management system 116, load forecast information from the forecasting applications 114, transmission model information from the transmission network database 112, and bids and offers as well as generation and load data from stakeholders 102, 104. An example of a commercially available energy management system 116 is the Spectrum Power™ Energy Market Management (EMM) system manufactured by Siemens Industry, Inc.

In some embodiments, the forecasting applications 114 include one or more software applications adapted to forecast future electrical power needs and/or consumption (e.g., load demand on an hourly basis, a fifteen minute interval basis, thirty minute interval basis, or the like) based on weather forecasts (e.g., predicted temperature, wind, sunlight, storms, etc.) and other factors (e.g., major sport events, public gatherings, etc.). In some embodiments, the transmission network database 112 includes a database that stores information regarding the network equipment such as transmission lines, power transformers, switches and circuit breakers, and their current and future configurations (e.g., the various ways the equipment is connected). In some embodiments, the transmission network database 112 can be used by and include software applications that, for example, perform AC power flow analysis.

Each element of the energy delivery system 100 shown can be implemented using one or more computers executing software applications adapted to implement the listed functions and networked together to facilitate communication of the information described.

Figure 2:
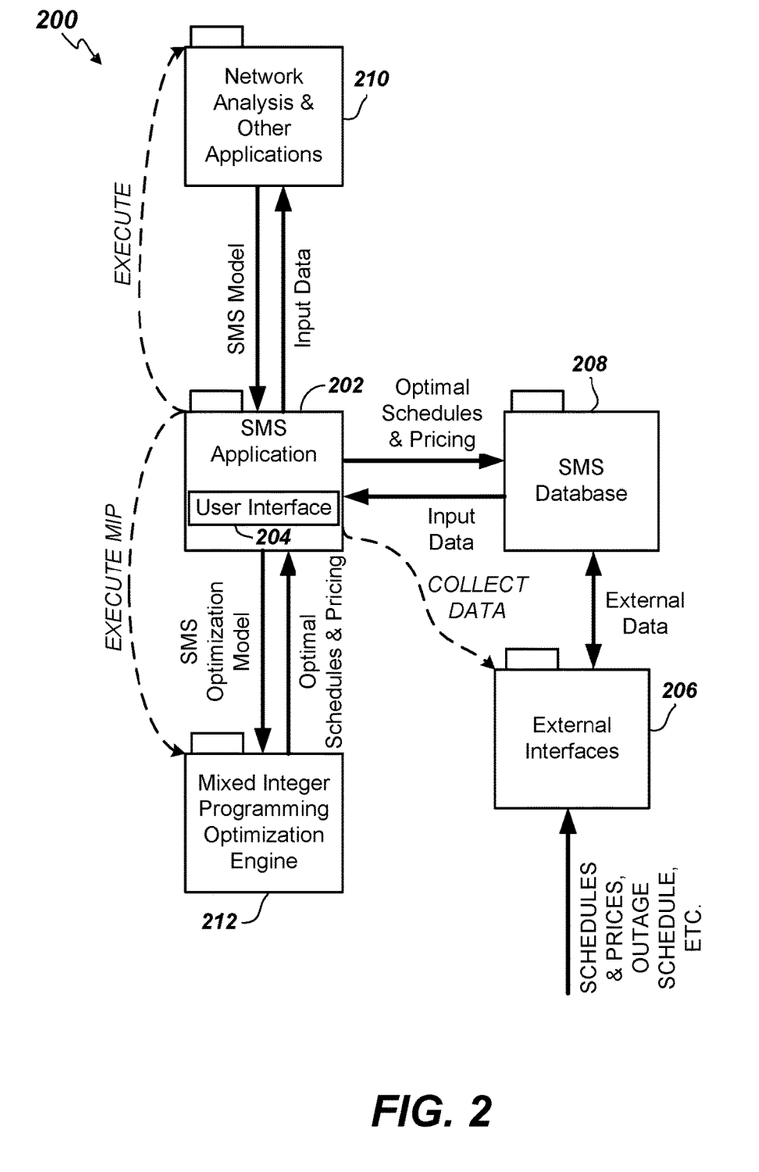
FIG. 2 is a schematic depiction of details of an example stakeholder market simulator according to embodiments of the present invention.

Turning now to FIG. 2, details of an example SMS system 200 within a SMS stakeholder 102 is presented as a schematic block diagram. The SMS system 200 is controlled by a SMS application 202 that in some embodiments can include a user interface 204 used to access and control the SMS system 200. The SMS application 202 is used to initiate collection of data from external interfaces 206 to, for example, the ISO 106 (FIG. 1) and other external data sources. For example, in some embodiments, interfaces to an energy management system, forecasting applications, a transmission network database, and other applications can be provided. The collected data is stored in the SMS database 208. Other data available to the stakeholder user can be entered into the SMS database 208 via the user interface 204 by the stakeholder user.

Once the data has been collected and stored, the SMS application 202 initiates execution of a model creation function 210 to express a model based on needed ISO published information and other data that is provided by the SMS application 202 based on input data from the SMS database 208. Once the network model has been determined, the SMS application 202 initiates execution of a mixed integer programming (MIP) optimization engine 212 and provides the network model to the MIP optimization engine 212 as a SMS optimization problem model. The MIP optimization engine 212 determines and returns the optimal generation and outage schedules for the stakeholder's resources which are stored back in the SMS database 208 for access via the user interface 204. Note that the components of the SMS system 200 can be implemented on one or more computers (e.g., networked together) each with one or more processors and memories, the memories operable to store instructions executable on the processors to implement the components of the SMS system 200.

In some embodiments, the user interface 204 within the SMS application 202 includes client applications and/or internet webpages enabling the user to provide/modify the input data and observe the results/outputs of the SMS system 200. The user interface 204 can include a set of displays for data/parameter presentation and/or editing as well as various controls for initiating and terminating SMS application functions (e.g., execute SMS application 202, collect data, execute model creation function, execute MIP, store data, display data, etc.) In some embodiments, the external interfaces 206 include one or more applications for communicating with, for example, market participant applications/databases, an energy management system, load forecast applications, and other applications/databases that provide data to, or receive data from, the SMS system 200. In some embodiments, the SMS database 208 includes a commercially available database management system (DBMS) such as the Oracle RDBMS manufactured by Oracle Corporation of Redwood City, Calif. The SMS database 208 is adapted to store SMS data under the control of the SMS application 202. In some embodiments, the SMS application 202 includes one or more software applications, algorithms and procedures as described herein for implementing embodiments of the SMS system 200 and methods of the present invention.

In some embodiments, the model creation function 210 includes a model editor and other applications that allow creation of a SMS model incorporating constraints describing the stakeholder's resources based on the input data. In some embodiments, the MIP optimization engine 212 can include commercially available solvers such as CPLEX, GuRoBi, or other third-party solver.

Within the SMS database 208, information can be stored in a structure based upon how the data is used in the constraints that define the SMS optimization model. The data can include public data and private stakeholder data. Both public data and private stakeholder data can include both static data and dynamic data.

In some embodiments, the public static data can include, for example, penalties for constraint violations for scheduling and pricing executions for: system energy requirements, ancillary services (AS) (e.g., regulation up and down, spin and non-Spin) requirements for the system and sub-regions, flowgates and nomograms, and inter-ties. In some embodiments, the public dynamic data can include, for example, energy market clearing prices for the system, AS (e.g., regulation up and down, spin and non-spin) for the system and sub-regions, and for binding flowgates and nomograms: IDs, shift factors for P-nodes related to stakeholder resources (generators, loads and interties), and shadow (e.g., congestion) prices.

In some embodiments, the private stakeholder static data can include, for example, generator resistance temperature detector (RDT) output data, inter-tie RDT output data, load RDT output data, and group constraints RDT output data. In some embodiments, the private stakeholder dynamic data can include, for example, outage and derate information for stakeholder resources, and commodity awards for stakeholder resources.

In some embodiments, the SMS system 200 supports two different types of simulations, the first driven by market schedules, and the second driven by market clearing prices. These two types differ in the way the rest of the market, i.e., non-SMS entities, are represented in each type of simulation. Differences in the representations are reflected in the system constraints and in the objective function as will be explained below. In either type of simulation, the SMS resources are represented in the same way.

For schedule driven simulations (SDS), the basic premise is that all non-SMS entities, taken as an aggregate, are fixed at the values reported by the ISO for a given market execution (e.g., case). For example, consider a market with a load balance constraint for time interval t:

$$\sum_{SMS} LPF_{k,t} \cdot P_{k,t} + \sum_{non\text{-}SMS} LPF_{k,t} \cdot P_{k,t} + P_{over,t} - P_{under,t} = SYSL_t$$

where $SYSL_t$ is the system load forecast for time interval t as published ($SYSL_1=0$ in the present form of IFM), $P_{1,k}$ are (dispatchable or fixed) generations, inter-ties or loads, and $LPF_{t,k}$ are their respective loss penalty factors. $P_{over,t}$ and $P_{under,t}$ are the variables allowing for over and under generation.

Based on the above assumption, the SMS load balance constraint becomes:

$$\sum_{SMS} LPF_{k,t} \cdot P_{k,t} + P_{over,t} - P_{under,t} = \sum_{non\text{-}SMS} LPF_{k,t} \cdot P^*_{k,t}$$

where $P^*_{k,t}$ are the awards as communicated by the ISO. $LPF_{k,t}$ for the SMS entities are also communicated by the ISO as loss components of the applicable LMPs.

As another example, consider (sub) regional spin requirements constraints. If the constraint is not binding it will be ignored, so assume that it is binding at either minimum or maximum requirement. Based on the assumption that the non-SMS awards are fixed as an aggregate, the spin requirements for a given region becomes:

$$\underline{SPREQ}_t = \sum_{non\text{-}SMS} SP^*_{k,t} \leq \sum_{SMS} SP_{k,t} + \text{RgUp\_SP}_t - \text{SP\_NS}_t$$

or $$\sum_{SMS} SP_{k,t} + \text{RgUp\_SP}_t - \text{SP\_NS}_t \leq SPREQ_t - \sum_{non\text{-}SMS} SP^*_{k,t}$$

where $SP_{k,t}$, $SP^*_{k,t}$ are the simulation spin variables and spin awards as reported, $\text{RgUp\_SP}_t$ and $\text{SP\_NS}_t$ are amounts for AS cascaded in and out of region (Reg up to Spin and Spin to Non spin).

Either of the constraints can be replaced by:

$$\sum_{SMS} SP_{k,t} + \text{RgUp\_SP}_t - \text{SP\_NS}_t = \sum_{SMS} SP^*_{k,t}$$

By the same line of argument, one can represent any binding transmission constraint as:

$$\sum_{SMS} SF_{k,t} \cdot P_{k,t} - LF_{over,t} + LF_{under,t} = \sum_{SMS} SF_{k,t} \cdot P^*_{k,t}$$

where $SF_{k,t}$ is the published network shift factors, $LF_{over}$ and $LF_{under}$ are the flowgate constraint violation variables. The objective function in this case (i.e., a schedule driven simulation) is the same as in the actual market but specified with respect to the stakeholder's resources/bids.

For market clearing price (MCP) driven simulations (MDS), instead of award schedules of the SMS entities, the published market clearing prices for the market commodities and congestion prices for transmission flowgates and nomograms are used as inputs. The objective of MDS simulation is to find the optimal schedules of the stakeholder's entities in response to the published market (shadow) prices taking into account the stakeholder's actual production costs. To be more precise, assume $MCP_1$ is the published energy market clearing price at time t. Then the load balance equation will be represented as:

$$\sum_{SMS} LPF_{k,t} \cdot P_{k,t} + P_{over,t} - P_{under,t} = SYSL_t$$

With the objective components correspond to $P_{over,t}$ and $P_{under,t}$ variables (unbounded non-negative) changed to:

Obj= . . . +$MCP_t \cdot P_{over,t}$ − $MCP_t \cdot P_{under,t}$+ . . .

Note that since $P_{over,t}$ and $P_{under,t}$ are non-negative and unbounded variables, we can arbitrarily choose the right hand side. $SYSL_t$=0 will be used.

Further, consider a directional market flowgate constraint:

$$\sum_{SMS} SF_{k,t} \cdot P_{k,t} + \sum_{non\text{-}SMS} SF_{k,t} \cdot P_{k,t} - LF_{over,t} \leq \overline{TL_t}$$

And assume that it has non-zero congestion cost (shadow) price $TSP_t$>0. In the MDS simulation the constraint will be represented as:

$$\sum_{SMS} SF_{k,t} \cdot P_{k,t} - LF_t \leq \overline{TL_t}$$

where LF1 is a non-negative variable, with the following component in the objective function:

Obj= . . . +$TSP_t \cdot LF_t$+ . . .

Again, the choice of the right hand side is arbitrary, and we decide to keep it at the original flowgate limit.

This approach ensures that the simulation will result in the energy market clearing price exactly equal to the reported one, and that the congestion cost will be LESS or EQUAL to the published one. The same approach is followed with each of the other system constraints.

Figure 3:
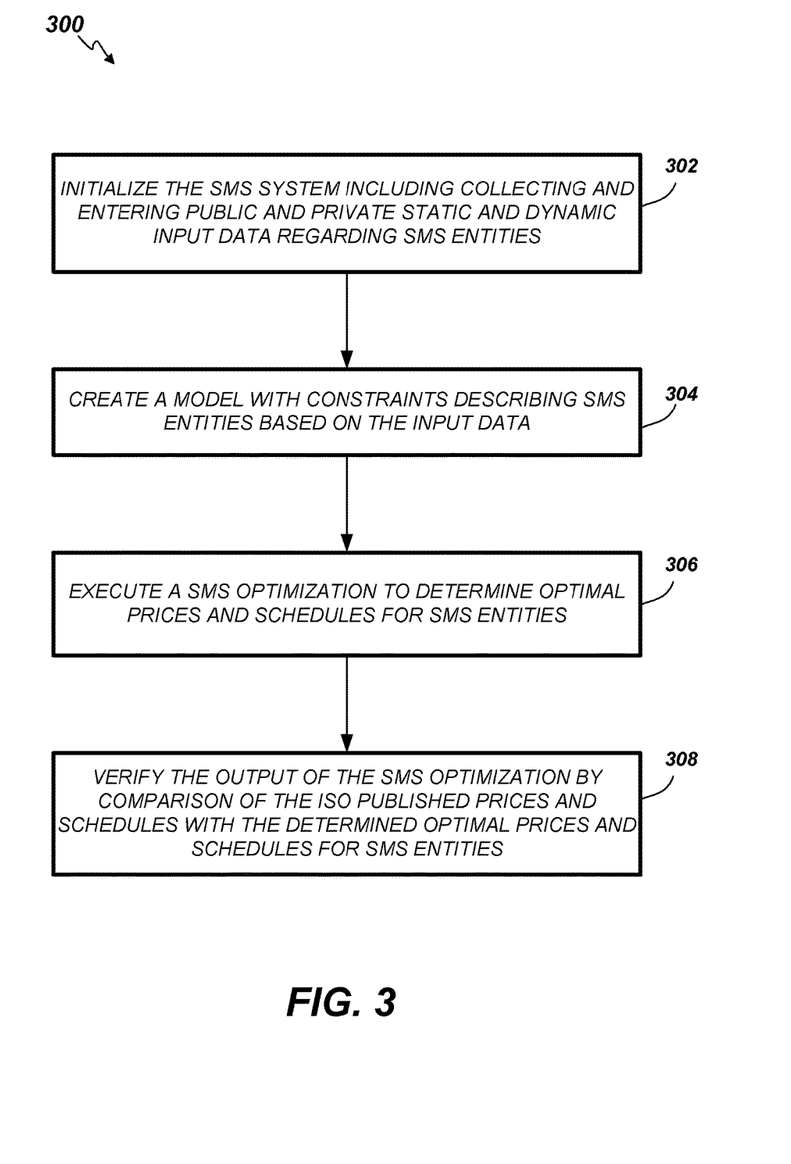
FIG. 3 is a flowchart depicting an example method according to embodiments of the present invention.

Turning now to FIG. 3, a flowchart depicting a high level representation of a stakeholder market simulator computational method 300 is provided. Note that in some embodiments, the stakeholder market simulator computation method 300 can be based on the same computational paradigm used to compute the day ahead (DA) market SCUC network analysis for determining pricing and generation schedules but only considering the SMS entities.

In some embodiments, the stakeholder market simulator computation method 300 starts with the SMS system initialization (302). During SMS system initialization, initial input data (e.g., new and existing configuration information, resource information, stakeholder information, public and private static and dynamic data, etc.) is entered and data validation functions are executed. Next, a model as described above incorporating constraints describing the stakeholder's resources based on the input data (e.g., ISO published data) is created (304).

Using the model, the stakeholder market simulator computational method 300 executes a SMS optimization execution (306) that is either a schedule driven simulation (SDS) or a MCP driven simulation (MDS) depending on the user's (e.g., the stakeholder's) selection. Regardless of whether a SDS or MDS is selected, the SMS optimization execution is based on optimizing the SMS entities resources as described in detail above. The underlying problem model can be expressed as a large and complex mixed integer programming (MIP) problem. For example, in some embodiments, the problem can be expressed and solved using linear programming (LP), quadratic programming (QP), quadratically constrained programming (QCP), mixed integer linear programming (MILP), mixed-integer quadratic programming (MIQP), and/or mixed-integer quadratically constrained programming (MIQCP). In some embodiments, the problem model can be solved using commercially available MIP solver software applications such as, for example, the IBM ILOG CPLEX Optimization Studio (CPLEX) manufactured by IBM Corporation of Armonk, N.Y., USA or the Gurobi Optimizer (GuRoBi) manufactured by Gurobi Optimization, Inc. of Houston, Tex., USA. The SMS system 200 can include an implementation of a generalized solver application programming interface (API) which enables the use of commercially available solvers such as CPLEX, GuRoBi, or other third-party solver.

Based on the constraints used in the model, the SMS optimization execution process determines the optimal prices and schedules for SMS entities considering user set optimality criteria (e.g., relative and/or absolute MIP gaps). The resulting SMS optimal prices and schedules are verified in a subsequent verification process (308). In case of schedule driven simulation, the verification process is focused on comparison between the schedules of SMS resources communicated by the ISO with the ones produced by the simulation. In some embodiments, the differences can indicate existence of issues with the ISO published schedules and serve as a basis for a formal challenge, or provide a basis for generation cost comparisons of the schedules that can lead to better guided future biddings. The price driven simulation is also used to verify consistency of the stakeholder's award schedules against the ISO published prices, and for exploration of different bidding strategies that would lead to better market valuation of the stakeholder's resources.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of operating one or more generators in an energy delivery system having one or more individual stakeholders, the method comprising:
   receiving, by an individual stakeholder of the one or more individual stakeholders, via a communications network, published prices and published schedules from an independent system operator, wherein the published prices and published schedules have been optimized for the energy delivery system as a whole, and wherein the individual stakeholder performs a bidding process;
   obtaining, by the individual stakeholder, initial resource schedules and prices for one or more resources of the individual stakeholder using a set of input data regarding the individual stakeholder's resources, wherein the individual stakeholder's resources comprise one or more generators;
   creating, by the individual stakeholder, a model incorporating constraints describing the individual stakeholder's resources based on the set of input data;
   executing, by the individual stakeholder, an optimization of an objective function for the individual stakeholder's resources, subject to the constraints incorporated in the model, to produce prices and schedules optimized for the individual stakeholder's resources;
   comparing the prices and schedules optimized for the individual stakeholder's resources against the published prices and published schedules optimized for the energy delivery system as a whole to produce a comparison result;
   determining, by the individual stakeholder, based on the comparison result, whether the published prices and the published schedules optimized for the energy delivery system as a whole are sub-optimal for the individual stakeholder;
   altering operation of the individual stakeholder's one or more generators responsive to determining that the published prices and the published schedules optimized for the energy delivery system as a whole are sub-optimal for the individual stakeholder;
   modifying the bidding process of the individual stakeholder responsive to determining that the published prices and the published schedules optimized for the energy delivery system as a whole are sub-optimal for the individual stakeholder; and
   operating the energy delivery system, based, at least in part, on the prices and schedules optimized for the individual stakeholder's resources via a generation control and load management system.

2. The method of claim 1, wherein the set of input data comprises:
   public data, and private data of the individual stakeholder.

3. The method of claim 2, wherein the public data comprises:
   static data, and dynamic data,
   wherein the static data includes at least penalties for violations for scheduling and pricing executions for flowgates, nomograms, and inter-ties, and
   wherein the dynamic data includes at least energy market clearing prices for the energy delivery system.

4. The method of claim 2, wherein the individual stakeholder's private data comprises:
   static data, and dynamic data, wherein the static data includes at least resistance temperature detector output data, and
wherein the dynamic data includes at least outage and derate information for the individual stakeholder's resources.

5. The method of claim 1, wherein executing the optimization of the objective function for the individual stakeholder's resources comprises:
using a general solver application.

6. The method of claim 1, wherein executing the optimization of the objective function for the individual stakeholder's resources comprises:
using a schedule driven simulation.

7. The method of claim 1, wherein executing the optimization of the objective function for the individual stakeholder's resources comprises:
using a market clearing price driven simulation.

8. An energy delivery system comprising:
an independent system operator (ISO) system including a generation control and load management system, the ISO system configured to produce published prices and published schedules optimized for the energy delivery system as a whole;
an individual stakeholder configured to produce first bids in a first manner, the individual stakeholder comprising:
a processor;
a memory coupled to the processor and having stored therein a first set of instructions that, when executed by the processor, cause the individual stakeholder to:
obtain initial resource schedules and prices for one or more resources of the individual stakeholder using a set of input data regarding the individual stakeholder's resources;
create a model incorporating constraints describing the individual stakeholder's resources based on the set of input data, wherein the individual stakeholder's resources comprise one or more generators;
execute an optimization of an objective function for the individual stakeholder's resources subject to the constraints incorporated in the model to produce prices and schedules optimized for the individual stakeholder's resources;
compare the prices and schedules optimized for the individual stakeholder's resources against the published prices and published schedules optimized for the energy delivery system as a whole to produce a comparison result;
determine, based on the comparison result, whether the published prices and the published schedules optimized for the energy delivery system as a whole are sub-optimal for the individual stakeholder;
alter operation of the individual stakeholder's one or more generators responsive to determining that the published prices and the published schedules optimized for the energy delivery system as a whole are sub-optimal for the individual stakeholder; and
configure the individual stakeholder to produce second bids in a second manner, responsive to determining that the published prices and the published schedules optimized for the energy delivery system as a whole are sub-optimal for the individual stakeholder;

wherein the ISO system is further configured to operate, via the generation control and load management system, the energy delivery system based, at least in part, on the prices and schedules optimized for the individual stakeholder's resources.

9. The energy delivery system of claim 8, wherein the set of input data includes public data, and private data of the individual stakeholder.

10. The energy delivery system of claim 9, wherein the public data comprises:
static data, and dynamic data,
wherein the static data includes at least penalties for violations for scheduling and pricing executions for flowgates, nomograms, and inter-ties, and
wherein the dynamic data includes at least energy market clearing prices for the energy delivery system.

11. The energy delivery system of claim 9, wherein the individual stakeholder's private data comprises:
static data, and dynamic data,
wherein the static data includes at least resistance temperature detector output data, and
wherein the dynamic data includes at least outage and derate information for individual stakeholder's resources.

12. The energy delivery system of claim 8, further comprising:
a second set of instructions, which when executed by the processor, cause the processor to execute the optimization of the objective function for the individual stakeholder's resources, using a general solver application.

13. The energy delivery system of claim 8, further comprising:
a third set of instructions, which when executed by the processor, cause the processor to execute the optimization of the objective function for the individual stakeholder's resources, using a schedule driven simulation.

14. The energy delivery system of claim 8, further comprising:
a fourth set of instructions, which when executed by the processor, cause the processor to execute the optimization of the objective function for the individual stakeholder's resources, using a market clearing price driven simulation.

15. A method of controlling one or more generators of a first individual stakeholder in an energy delivery system having a plurality of individual stakeholders, comprising:
receiving, by the first individual stakeholder, prices and schedules from an independent system operator (ISO), wherein the prices and schedules have been optimized for the energy delivery system as a whole;
generating a bid by the first individual stakeholder in accordance with a first bidding process, and transmitting the bid to the ISO;
obtaining, by the first individual stakeholder, initial schedules and prices for one or more of its generators, using a set of input data regarding the one or more generators;
creating, by the first individual stakeholder, a model incorporating constraints describing the one or more generators based on the set of input data;
executing, by the first individual stakeholder, a first optimization for the first individual stakeholder's one or more generators, to produce prices and schedules optimized for the one or more generators;

comparing the prices and schedules optimized for the one or more generators against the prices and schedules optimized for the energy delivery system as a whole, and producing a comparison result;

altering operation of the first individual stakeholder's one or more generators responsive to determining that the prices and the schedules optimized for the energy delivery system as a whole are sub-optimal for the first individual stakeholder;

modifying the first bidding process responsive to determining that the prices and the schedules optimized for the energy delivery system as a whole are sub-optimal for the first individual stakeholder; and operating, by the ISO, the energy delivery system, based, at least in part, on the prices and schedules optimized for the first individual stakeholder's generators.

* * * * *